United States Patent [19]

Eschner et al.

[11] 4,241,781
[45] Dec. 30, 1980

[54] REGENERATIVE HEATER AND PROCESS FOR THE OPERATION THEREOF

[75] Inventors: Axel Eschner, Wiesbaden; Erich Pöhlmann, Kulmbach, both of Fed. Rep. of Germany

[73] Assignees: Didier-Werke AG, Wiesbaden; Kulmbacher Klimageräte-Werk GmbH & Co. KG, Kulmbach, both of Fed. Rep. of Germany

[21] Appl. No.: 922,431

[22] Filed: Jul. 6, 1978

[30] Foreign Application Priority Data

Jul. 9, 1977 [DE] Fed. Rep. of Germany ....... 2731115

[51] Int. Cl.³ ............................................. F28D 17/00
[52] U.S. Cl. .......................................... 165/1; 165/4; 165/104 S; 165/107 R; 165/134 R
[58] Field of Search .................... 165/104 S, 107, 134, 165/4, 1, DIG. 4; 219/365

[56] References Cited

U.S. PATENT DOCUMENTS

| 1,940,371 | 12/1933 | Royster | 165/4 X |
| 2,121,733 | 6/1938 | Cottrell | 165/4 X |
| 2,735,278 | 2/1956 | Rice | 165/4 X |
| 3,452,810 | 7/1969 | Schmidt et al. | 165/4 X |
| 4,124,061 | 11/1978 | Mitchell et al. | 165/104 S |

*Primary Examiner*—Albert W. Davis

*Attorney, Agent, or Firm*—Wenderoth, Lind & Ponack

[57] ABSTRACT

A regenerative heater includes a regenerator container having open opposite ends. The container contains therein a fill of heat retaining material which is permeable to the passage therethrough of gas, throughout the entire length thereof in opposite directions between the open opposite ends of the container. The fill of heat retaining material comprises solid fine granular particles having a low thermal conductivity. A heat source is positioned adjacent the first end of the fill of heat retaining material. At least one blower is provided for circulating gas in opposite directions through the entire length of the fill of heat retaining material and across substantially the entire cross-section thereof. A charging flow of gas is first circulated in a first direction through the fill of heat retaining material, such that the charging flow of gas is heated by the heat source and then passes through the heat retaining material while transferring heat to the heat retaining material. Then, a discharging flow of gas is passed in a second opposite direction through the fill of heat retaining material, such that the discharging flow of gas receives heat from the fill of heat retaining material. At least the charging flow of gas is entirely enclosed in a completely closed circulation path including the interior of the regenerator container.

31 Claims, 4 Drawing Figures

4,241,781

REGENERATIVE HEATER AND PROCESS FOR THE OPERATION THEREOF

BACKGROUND OF THE INVENTION

The present invention relates to a regenerative heater and the process for the operation thereof, wherein the regenerative heater includes a regenerator container containing therein a fill of heat retaining material which is permeable to air and gas, wherein gas is conveyed through the heat retaining material in opposite directions as charging and discharging flows of gas, and wherein a source of heat is arranged in front of the heat retaining material taken in the direction of the charging flow of gas.

A regenerative heater of this type is known from German DT-OS No. 19 39 534. Such known regenerative heater includes a regenerative oven containing a fill of ceramic particles provided in a bottle-like container having a closed bottom and an open top. When the regenerative oven is charged, air is led past a source of heat, through the open top of the container, and into the fill. After the air yields its heat to the fill, the air escapes laterally to the exterior through the walls of the container. During the discharging operation, fresh air is led laterally through the walls of the container and into the fill. After the air is heated by receiving heat from the fill, the air is removed through the upper open end of the container. The operation of this known regenerative heater is however disadvantageously affected by the fact that both the charging and discharging flows of air are provided from relatively open circuits, and thus the effects of heating the fill and heating the discharging flow of air are difficult to accurately control. The known regenerative heater is further disadvantageous in that the charging air is removed from the container and the discharging air is introduced into the container through relatively small lateral openings in the walls of the container. This makes it very difficult to obtain contact between the respective flows of air and all of the ceramic particles in the fill. Thus, the heat exchange between the flows of gas and the particles of the fill is inefficient.

SUMMARY OF THE INVENTION

With the above discussion in mind, it is a principle object of the present invention to provide a regenerative heater and a process for the operation thereof whereby it is possible to obtain a very rapid and a very highly efficient heat exchange between the fill of heat retaining material and the charging and discharging flows of gas.

It is a further object of the present invention to provide such a regenerative heater and process for the operation thereof whereby it is possible to obtain such improved heat exchange performance, even when the charging operation is carried out for only very short periods of time.

The above objects are achieved in accordance with the present invention by providing that the regenerative heater includes a regenerator container having open opposite ends and air or gas impermeable walls. A fill of heat retaining material is positioned within the regenerator container such that the fill of heat retaining material is permeable to the passage therethrough of air, throughout the entire length of the fill of heat retaining material taken in opposite directions between the open opposite ends of the regenerator container. A heat source is positioned adjacent a first end of the fill of heat retaining material. A charging flow of gas is circulated in a first direction through the fill of heat retaining material such that the charging flow of gas is heated by the heat source and then passes through the entire length of the fill of heat retaining material, from the first end thereof to a second opposite end thereof, and across substantially the entire cross-section thereof, while transferring heat to the fill of heat retaining material. A discharging flow of gas may then be circulated in a second direction opposite to the first direction through the fill of heat retaining material, such that the discharging flow of gas passes through the entire length of the fill of heat retaining material, from the second end thereof to the first end thereof, and across substantially the entire cross-section thereof, while receiving heat from the previously heated fill of heat retaining material. At least the charging flow of gas is entirely enclosed in a completely closed circulation path which includes the interior of the regenerator container. The fill of heat retaining material comprises solid fine granular particles having a low thermal conductivity.

During the charging operation, due to the fact that the charging flow of gas passes through substantially the entire cross-section of the fill, and also throughout the entire length of the fill, the fill is gradually warmed up in uniform layers extending across the entire cross-section thereof. That is, the charging flow of gas, heated by the heat source, passes through the entire cross-section of the first end of the fill and therefore uniformly heats up the entire cross-section of the fill adjacent the first end thereof. As the fill particles adjacent the first end absorb their maximum capacity of heat, later charging gas gradually uniformly warms up further layers of the fill particles across the entire cross-section of the fill. Due to the fact that the fill particles have a low thermal conductivity, the heating of the fill particles is achieved entirely by heat transfer from the charging gas, and not by thermal conduction between the particles within the fill. Thus, the area of the fill adjacent the heat source is warmed up very rapidly to high temperatures, for example a temperature of approximately 800° C., while the following areas of the fill are sequentially and gradually warmed up. The temperature gradient within the fill is relatively steep and travels gradually from the first end of the fill to the second end of the fill during the duration of the charging operation. More particularly, as a given volume or layer of the fill extending across the entire cross-section thereof is heated to a maximum temperature of absorption of a maximum capacity of heat, such given volume or layer cannot absorb further heat from the charging flow of gas. Thus, successive portions of the charging flow of gas heat the next successive layer or volume of fill spaced further from the heat source.

The charging operation is maintained for a desired length of time during which a desired portion or all of the fill of heat retaining material is heated. Thereafter, the discharging flow of gas is circulated through the fill of heat retaining material in an opposite direction thereof, but also throughout the entire length of the heat retaining material, and also across substantially the entire cross-section thereof. Therefore, the discharging flow of gas is relatively rapidly heated to the desired high temperature, since the discharging flow of gas cannot pass through any cross-sectional portion of the fill that has not been heated during the previous charging operation. Therefore, even if the charging operation is carried out for only a relatively short length of time, such that only the volume or layer of the fill adjacent the heat source has been heated, the discharging flow of gas thereafter passing through the fill is still rapidly heated to a desired temperature. Furthermore, due to the fact that the particles of the fill of heat retaining material have a low thermal conductivity, there will be no heat dissipation from a given cross-section of the fill due to thermal conduction among the particles of the fill. Therefore, a given cross-sectional area of the fill which has been heated during charging operation will maintain such heat until a later discharging operation.

Additionally in accordance with the present invention, at least the charging flow of gas is always maintained and entirely enclosed within a completely closed circulation path which includes the interior of the regenerator container. That is, the charging flow of gas is never made a portion of an open circuit. Accordingly, it is much easier to maintain and control the efficiency of the charging operation.

Further, the discharging flow of gas may also be entirely enclosed in the completely closed circulation path. Alternatively, the discharging flow of gas may originate from the exterior of the completely closed circulation path and may discharge gas which is heated by the fill of heat retaining material to a consumer exterior of the closed circulation path.

When both the charging and discharging flows of gas are entirely enclosed within the completely closed circulation path, then the discharging flow of gas which is heated by the fill of heat retaining material may transfer heat to a heat exchanger, for example an indirect heat exchanger having one of the flow paths thereof within the completely closed circulation path.

When both the charging and discharging flows of gas are maintained within the completely closed circulation path, the circulation of both the charging and discharging flows of gas in opposite directions through the fill of heat retaining material may be achieved by operation of a reversibly operable single blower. When the discharging flow of gas originates exterior of the completely closed circulation path, then the circulation of the charging flow of gas may be achieved by a first blower which is provided within the completely closed circulation path, and the circulation of the discharging flow of gas may be achieved by a second blower positioned exterior of the completely closed circulation path, the second blower being selectively connectable to the regenerator container.

In accordance with a further feature of the present invention, there is provided means for preventing the blower from becoming over-heated during the circulation of the charging flow of gas. That is, during the charging operation, if the entire fill of heat retaining material absorbs its maximum capacity of heat, then if the charging operation is thereafter continued, the charging flow of gas will maintain its heat after passage through the fill of heat retaining material. If such heated charging flow of gas were to be allowed to reach the blower which is maintained in the completely closed circulation path, the blower would be damaged. The present invention includes means for preventing such damage to the blower.

Specifically, in accordance with one embodiment of the present invention, it is possible to provide within the closed circulation path, between the second end of the fill of heat retaining material and the blower, a second or auxiliary regenerator container containing therein a fill of heat retaining material similar to the fill of heat retaining material in the main regenerator container. Thus, if the fill of heat retaining material in the main regenerator container has absorbed its maximum capacity of heat, then the heat thereafter retained in the charging flow of gas will be absorbed in the fill of heat retaining material within the auxiliary regenerator container. The heat absorbed in the auxiliary regenerator container will not be wasted, since upon the discharging operation the discharging flow of gas will first flow through the auxiliary regenerator container and receive the previously absorbed heat therefrom.

In accordance with a further arrangement of the present invention, there may be provided a conventional temperature detector and thermostat which determines when the auxiliary regenerative heater has absorbed a predetermined maximum quantity of heat from the charging flow of gas and for thereupon stopping operation of the blower.

Further alternatively, the auxiliary regenerative heater may be omitted, and a conventional temperature detector and thermostat may be provided adjacent the second end of the main generator container to thereby detect when the portion of the fill of heat retaining material adjacent the second or downstream end of the fill, taken in the direction of the charging flow of gas, has absorbed a maximum quantity of heat from the charging flow of gas, and for thereafter stopping operation of the blower.

It is of course to be understood that when the discharging flow of gas originates exterior from the completely closed circulation path, and only the blower for the charging flow of gas is included within the completely closed path, the above described expedients may be employed for preventing overheating of the blower for the charging flow of gas. The discharging flow of gas may be employed for the direct heating of air, even when the discharging flow of gas is circulated only within the completely closed circulation path. However, as discussed above, in accordance with an advantageous feature of the present invention, when the discharging flow of gas is circulated only within the completely closed circulation path, the discharging flow of gas transfers heat to a heat exchanger, for example an indirect heat exchanger. Furthermore, when a heat exchanger is provided as a portion of the completely closed circulation path, then in accordance with an advantageous feature of the present invention, the completely closed circulation path also includes a bypass for bypassing the charging flow of gas around the heat exchanger, to thereby reduce resistance to circulation of the gas during the charging operation. Such bypass flow of the charging flow of gas may be suitably regulated by valves.

Furthermore, in all embodiments of the present invention, during the circulation of the discharging flow of gas it is possible to bypass a portion of such discharging flow of gas around the fill of heat retaining material. It is therefore easy to regulate the temperature of the discharging flow of gas which is supplied to the consumer, e.g. the heat exchanger or the consumer exterior of the completely closed circulation path. More particularly, instead of leading the entire discharging flow of gas through the fill of heat retaining material, it is possible to bypass a portion of the discharging flow of gas around the fill of heat retaining material and thereafter admix such portion with that portion of the discharging flow of gas which has passed through and been heated by the fill of heat retaining material. The control of this bypassing operation may be automatically achieved, for example by means of a thermostat which measures the temperature of the discharging flow of gas exiting from the fill of heat retaining material or passing to the consumer, for example the heat exchanger or the consumer exterior of the completely closed circulation path. In a specific embodiment according to the present invention, wherein the system includes the above discussed auxiliary regenerative heater, a thermostat may be employed to detect the temperature of the gas passing through the auxiliary regenerative heater and to thereby control valves regulating the passage of the discharging flow of gas through the main fill of heat retaining material and through the bypass. In any case, and in all embodiments of the present invention, the regulation of the portions of the discharging flow of gas passing through the fill of heat retaining material and bypassing the fill of heat retaining material may be regulated by valves.

Due to the fact that the gas flowing through the completely closed circulation path assumes substantially different temperatures, and therefore also substantially different volumes, in accordance with a further feature of the present invention there is provided means for preventing an over-pressure from occurring in a portion of the completely closed circulation path. Specifically, the completely closed circulation path may include one or more enlarged equalization chambers to absorb potential volume increases of the gas, and to thereby prevent the occurrence of any over-pressure which would otherwise result in the possible occurrence of leaks in the system. Such leaks would not only represent a loss of efficiency of the system, but would also present a potential danger to the surrounding environment.

It has been found that optimum efficiency of the regenerative heater of the present invention is obtained when the length to width ratio of the fill of heat retaining material in the regenerator container is maintained within certain limits. The term "length" as employed herein is intended to refer to the dimension of the fill from the first end thereof to the second end thereof, i.e. the dimension of the fill between the open opposite ends of the regenerator container. Moreover, as employed herein the term "width" refers to the dimension of the fill taken in a direction transverse to the above defined length, that is the width of the fill is the transverse dimension of the fill. It has specifically been found that optimum efficiency is obtained when the above defined ratio is greater than one, preferably greater than 1.5, and lower than four, preferably lower than 2.5.

It has further been found that the efficiency of the regenerative heater of the present invention is additionally maximized by providing baffles adjacent opposite ends of the fill of heat retaining material, to thereby improve the uniform distribution of the respective flows of gas directed toward the respective ends of the fill. In accordance with the present invention, the fill of heat retaining material may be positioned vertically or horizontally in a selected portion of the completely closed circulation path. When the fill of heat retaining material is provided horizontally, then the fill is supported by the gas impermeable walls of the regenerator container. However, when the path of the flows of gas through the fill of heat retaining material extends vertically, then the fill is supported within the regenerator container by means of a support element. In one particularly advantageous arrangement of the invention, the support element is inclined toward the center of the regenerator container so that the height of the fill in the center of the regenerator container is greater than along the walls thereof. The support element may comprise a steel screen supported by a perforate plate, the screen having a mesh size to retain the fine granular solid particles of the fill. Alternatively however, the support element may comprise a filter plate formed of a temperature resistant concrete material, the support element thereby being easily manufactured as a single premanufactured component having a desired geometrical configuration.

The granular particles of the fill of heat retaining material preferably have a particle size of from 0.5 to 3 mm, and further preferably a particle size of from 1 to 3 mm. Such particle size provides that the fill of heat retaining material will be permeable to gas, but also provides a reasonable resistance to the passage through the fill of the gas so that the gas is exposed to a large surface area within the fill to thereby ensure a very rapid heat transfer between the gas and the particles during both the charging and the discharging operations. Additionally, it is possible to provide that the fill of heat retaining material includes a layer of granular particles, located directly above the support element, having a larger particle size of up to 10 mm, so that it is possible to employ a support element having a somewhat larger mesh size.

In accordance with an important feature of the present invention, as mentioned above, the granular particles of the fill of heat retaining material must have a low thermal conductivity. As employed herein the term "low thermal conductivity" is intended to mean that there will be substantially no transfer of heat by thermal conduction between the granular particles of the fill of heat retaining material, such that there will be no dissipation or wandering of the heat absorbed in a given volume of the fill during a charging operation to other volumes or areas of the fill. Preferably, the thermal conductivity of the granular particles of the fill of heat retaining material according to the present invention should be lower than 2 kcal/mh°C. It is believed that those skilled in the art will understand what types of commercially available material will have the above discussed low thermal conductivity and which may be employed as the granular particles for the fill of the heat retaining material in accordance with the present invention. However, examples of inexpensive material which may be employed as the heat retaining material in accordance with the present invention are natural magnesite and olivine. It is specifically to be understood however that the present invention is not limited to the use of these specific materials, but that other materials having the desired low thermal conductivity may be employed.

In accordance with a further feature of the present invention, the material employed for the fill of heat retaining material has a specific moisture content such that upon transfer of such moisture to the flows of gas during circulation thereof in the completely closed circulation loop, the gas will have a relative humidity which does not exceed 80%.

In accordance with a further feature of the present invention, the walls of the system, from the walls of the regenerator container to the position whereat the heat from the discharging flow of gas is transferred to a consumer, are enclosed with thermal insulation material, thereby further maintaining the efficiency of the system.

An additional advantage of the present invention is that, when the demand on the system is so great that the discharging flow of gas exiting from the fill of heat retaining material is not heated to the desired temperature, such discharging flow of gas may be supplementally heated by the heat source. This ensures that the system is operable even during periods of very great demand.

In accordance with an even further advantageous feature of the present invention, it is possible to regulate the operation of the regenerative heater as a function of the amount of heat required by the consumer. For example, it is possible to regulate the speed or RPM of the blower during the discharge operation as a function of the heat required by the consumer, for example a heat exchanger located in the completely closed circulation path or a consumer or load exterior to the completely closed circulation path.

BRIEF DESCRIPTION OF THE DRAWINGS

Other objects, features and advantages of the present invention will become apparent from the following detailed description thereof, taken with the accompanying drawings, wherein.

DETAILED DESCRIPTION OF THE INVENTION

Figure 1:
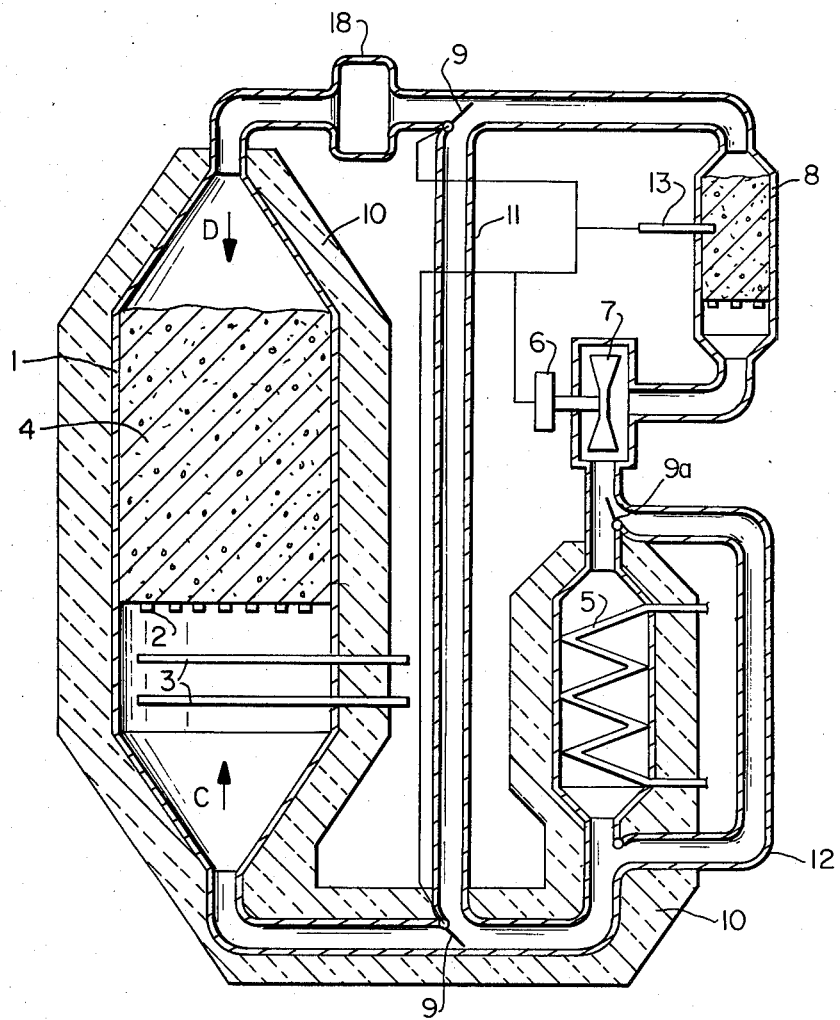
FIG. 1 is a schematic cross-sectional view illustrating a first embodiment of the present invention.

The regenerative heater of the embodiment of the present invention illustrated in FIG. 1 includes a regenerator container having open opposite upper and lower ends and air-impermeable walls. The interior of regenerator container 1 forms a portion of a completely closed circulation loop or path which also includes a second or auxiliary regenerator container 8, having a smaller capacity than regenerator container 1, a blower 7 driven by a driving motor 6, a heat exchanger 5, and a heat source 3 positioned adjacent one open end of regenerator container 1. These various elements are connected in a completely closed circulation path in any conventional manner, for example by means of the piping which is schematically illustrated in FIG. 1.

Figure 4:
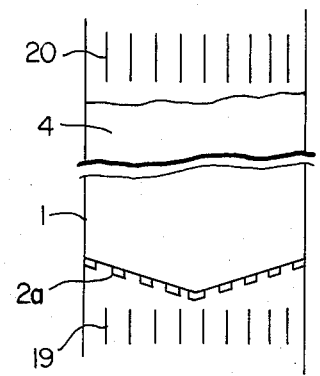
FIG. 4 is a schematic cross-sectional view illustrating a modification of a portion of the embodiment of FIG. 1.

Positioned within the interior of regenerator container 1 is a fill of heat retaining material 4 comprising solid fine granular particles having a low thermal conductivity. The fill of heat retaining material 4 is permeable to the passage therethrough of air or gas, throughout the entire length thereof taken in opposite directions between the open opposite ends of the regenerator container. In the embodiment shown in FIG. 1, the fill of heat retaining material 4 is supported vertically within the regenerator container 1, that is the charging and discharging flows of gas C and D, respectively, pass vertically through the fill. Thus, the fill of heat retaining material 4 is supported within the regenerator container 1 by means of a suitable support element 2. In one particularly advantageous arrangement of the invention, as schematically illustrated in FIG. 4 of the drawings, the support element 2a is inclined toward the center of the regenerator container 1 so that the height of the fill 4 in the center of the regenerator container is greater than along the walls thereof. The support element 2 may comprise a steel screen supported by a perforate plate, the screen having a mesh size to retain the fine granular solid particles of the fill 4. Alternatively however, the support element may comprise a filter plate formed of a temperature resistant concrete material.

The granular particles of the fill of heat retaining material 4 preferably have a particle size of from 0.5 to 3 mm, and further preferably a particle size of from 1 to 3 mm. This particle size provides that the fill of heat retaining material will be permeable to gas, but will also provide a reasonable resistance to the passage through the fill, so that the gas is exposed to a large surface area within the fill to thereby assure a very rapid heat transfer. However, it is additionally possible to provide that the fill of heat retaining material 4 includes a layer of granular particles, located directly above support element 2, having a larger particle size of up to 10 mm. This makes it possible to employ a support element 2 having a somewhat larger mesh size.

The granular particles of the fill of heat retaining material 4 must have a low thermal conductivity, so that there will be substantially no transfer of heat by thermal conduction between the granular particles of the fill. Preferably, the thermal conductivity of the granular particles of the fill of heat retaining material 4 according to the present invention is lower than 2 kcal/mh°C.

In the embodiment illustrated, the heat source 3 is schematically shown to comprise plural electrically controlled heating rods arranged one above the other at a position adjacent a first end of the fill of heat retaining material 4. It is however to be understood that heat source 3 may be in the form of any other conventional and known device for heating a flow of gas.

In the operation of the regenerative heater shown in FIG. 1, the blower 7 is first operated in a first direction to achieve a charging operation by circulating air around the completely closed circulation path in the direction indicated by the arrow C. Thereby, the charging flow of gas is heated by heat source 3 and then passes through the entire length of the fill of heat retaining material 4, from the first end thereof to the second end thereof. An important feature of the present invention is that the charging flow of gas C passes through the entire cross-section of the fill of heat retaining material, thereby transferring heat to the entire cross-section of the fill. Thus, the fill of heat retaining material 4 is sequentially heated in layers or volumes extending across the entire cross-section thereof. Due to the fact that the particles of the fill have a low thermal conductivity, heat is transferred to the fill only by the charging flow of gas, and not by heat conduction between the particles.

After the charging operation is maintained for a desired length of time during which a desired portion or all of the fill of heat retaining material 4 is heated by the charging flow of gas C, the operation of blower 7 is reversed so that there is circulated a discharging flow of gas D in a second opposite direction through the completely closed circulation path. The discharging flow of gas D also passes throughout the entire length of the fill of heat retaining material 4, throughout the entire cross-section thereof, and the discharging flow of gas D thereby is unavoidably heated by the heat retained in the fill of heat retaining material. Due to the fact that during the charging operation an entire cross-sectional volume portion of the fill is heated, then when the discharging flow of gas D passes through the fill, the discharging flow of gas cannot avoid being rapidly heated. The thus heated discharging flow of gas is then passed to a suitable consumer, for example the heat exchanger 5 illustrated in FIG. 1. The discharging flow of gas D thus gives up its heat to the fluid passing through the indirect heat exchanger in a conventional manner.

Attention is directed to the fact that in accordance with a further feature of the present invention, the completely closed circulation path may include bypass piping 12 for bypassing the charging flow of gas C around the heat exchanger 5 during the charging operation, thereby reducing resistance to circulation of the gas during the charging operation. Such bypass flow of the charging flow of gas may be suitably regulated by valves, for example valve 9a, as will be understood by those skilled in the art.

In accordance with a further feature of the present invention, baffles 19 and 20, as shown in FIG. 4, may be provided adjacent opposite ends of the fill of heat retaining material 4 to improve a uniform distribution of the respective flows of gas thereinto.

It will be understood that during the charging operation, if the entire fill of heat retaining material 4 absorbs its maximum capacity of heat, then if the charging operation is thereafter continued, the charging flow of gas C will maintain its heat after passage through the fill. If such heated charging flow of gas C were to be allowed to reach the blower 7, the blower would be damaged. Therefore, in accordance with a further feature of the present invention, there is provided means for preventing such damage to the blower 7. Specifically, in accordance with one embodiment of the present invention, it is possible to provide within the closed circulation path, between the fill of heat retaining material 4 and the blower 7, a second or auxiliary regenerator container 8 containing therein an auxiliary fill of heat retaining material similar to the fill of heat retaining material 4. Thus, if the fill of heat retaining material 4 has absorbed its maximum capacity of heat, then the heat thereafter retained in the charging flow of gas C will be absorbed in the fill of heat retaining material within the auxiliary regenerator container 8. This heat absorbed in the auxiliary regenerator container 8 will not be wasted, since upon the discharging operation the discharging flow of gas D will first flow through the auxiliary regenerator container and receive the previously absorbed heat therefrom.

In accordance with a further feature of the present invention however, there may be provided a conventional temperature detector and thermostat 13, schematically shown in FIG. 1, which determines when the auxiliary regenerative heater has absorbed a predetermined maximum quantity of heat from the charging flow of gas C and which thereupon stops operation of the motor 6 of blower 7.

Thereby, it is possible to prevent damage of the blower 7 due to overheating thereof.

In accordance with a further feature of the present invention, it is possible to regulate the temperature of the discharging flow of gas which is passed to the consumer, such as the heat exchanger 5. Specifically, a portion of the discharging flow of gas D may be bypassed around the fill of heat retaining material 4 by means of bypass 11. That is, instead of leading the entire discharging flow of gas D through the fill of heat retaining material 4, it is possible to bypass a portion of the discharging flow of gas D around the fill of heat retaining material 4 and thereafter admix such portion with that portion of the discharging flow of gas which has passed through and been heated by the fill. The regulation of the portions of the discharging flow of gas passing through the fill and passing through bypass 11 may be regulated by valves, for example valves 9, as will be understood by those skilled in the art. This regulation may be achieved automatically. Specifically, the above described thermostat 13 may detect the temperature of the discharging flow of gas passing through auxiliary regenerator container 8 after its passage through heat exchanger 5, and as a function of such temperature may regulate the relative positions of valve 9 to control the relative opening and closing of bypass 11.

Due to the fact that the gas flowing through the completely closed circulation path assumes substantially different temperatures, and therefore also substantially different volumes, in accordance with a further feature of the present invention there is provided means for preventing an over-pressure from occurring in a portion of the completely closed circulation path. Specifically, the completely closed circulation path may include one or more enlarged equalization chambers, for example such as shown at 18 in FIG. 1, to absorb potential volume increases of the gas and to thereby prevent the occurrence of any over-pressure which would otherwise result in the possible occurrence of leaks in the system.

Optimum efficiency of the regenerative heater of the present invention is obtained when the length to width ratio of the fill of heat retaining material 4 in the regenerator container 1 is maintained within certain limits. It has specifically been found that optimum efficiency is obtained when the above defined ratio is greater than one, preferably greater than 1.5, and lower than four, preferably lower than 2.5.

In accordance with a further feature of the invention, the walls of the completely closed circulation path, including the walls of the regenerator container 1, the walls of the heat exchanger 5, and the walls of the piping connecting the regenerator container and the heat exchanger, are enclosed within a thermal insulation material 10, to thereby further increase the heat transfer efficiency of the system.

In accordance with an even further feature of the present invention, the material employed for the fill of heat retaining material 4 has a specific moisture content such that upon transfer of such moisture to the flows of gas during circulation thereof in the completely closed circulation path, the gas will have a relative humidity which does not exceed 80%.

As mentioned above, in the embodiment of the present invention shown in FIG. 1, the fill of heat retaining material 4 is positioned vertically within regenerator container 1 and is supported therein by means of support element 2. However, it is also possible in accordance with the present invention that the fill of heat retaining material 4 be supported horizontally within the regenerator container, and specifically on the air impermeable walls thereof. Such an arrangement is shown schematically in FIG. 2 of the drawings, and in this arrangement the provision of support element 2 is not necessary. The embodiment of FIG. 2 may be in all other respects identical to the embodiment of FIG. 1 as described above. However, the arrangement of FIG. 2 of the drawings does not disclose equalization chamber 18 or bypass 11. It is however to be understood that such elements could be included in the arrangement of FIG. 2.

Figure 2:
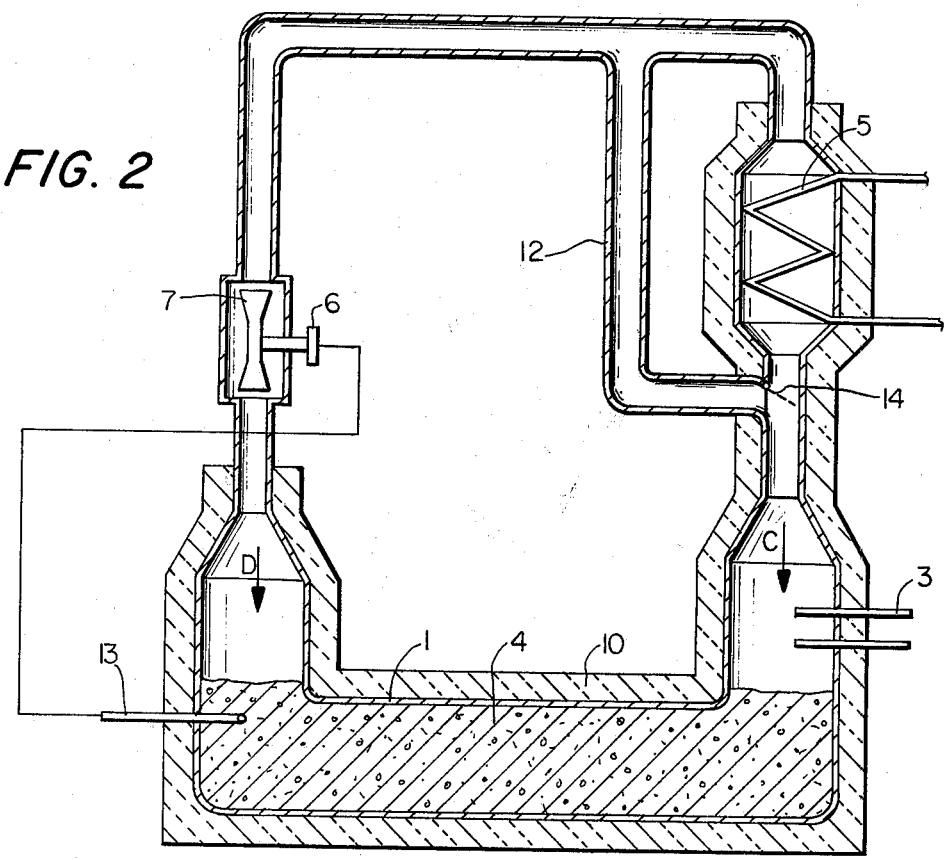
FIG. 2 is a schematic cross-sectional view illustrating a second embodiment of the present invention.

Additionally, the embodiment of FIG. 2 illustrates a revised arrangement for preventing overheating of the blower 7. Specifically, in the arrangement of FIG. 2 there is no provision for the auxiliary regenerator container 8. Rather, temperature detector and thermostat 13 are provided adjacent the second end of the regenerator container 1 to thereby detect when the portion of the fill of heat retaining material 4 adjacent the second or downstream end of the fill, taken in the direction of the charging flow of gas C, has absorbed a maximum quantity of heat from the charging flow of gas, and for thereafter stopping operation of the driving motor 6 of blower 7.

Additionally, FIG. 2 illustrates that bypass 12 for bypassing the charging flow of gas C around the heat exchanger 5 may be opened and closed by a valve 14 arranged between the heat source 3 and the heat exchanger 5.

Except as noted hereinabove, the embodiment of FIG. 2 is the same as and may be adapted to include the above discussed features of the embodiment of FIG. 1.

In both of the above described embodiments of FIGS. 1 and 2, both the charging and discharging flows of gas are entirely enclosed and circulated within the completely closed circulation path. However, it is intended to be within the scope of the present invention that, while the charging flow of gas C is always maintained within the completely closed circulation path, the discharging flow of gas D may originate from a source exterior of the completely closed circulation path and may discharge gas which is heated by the fill of heat retaining material to a consumer exterior of the closed circulation path. Such an arrangement is shown in FIG. 3.

Figure 3:
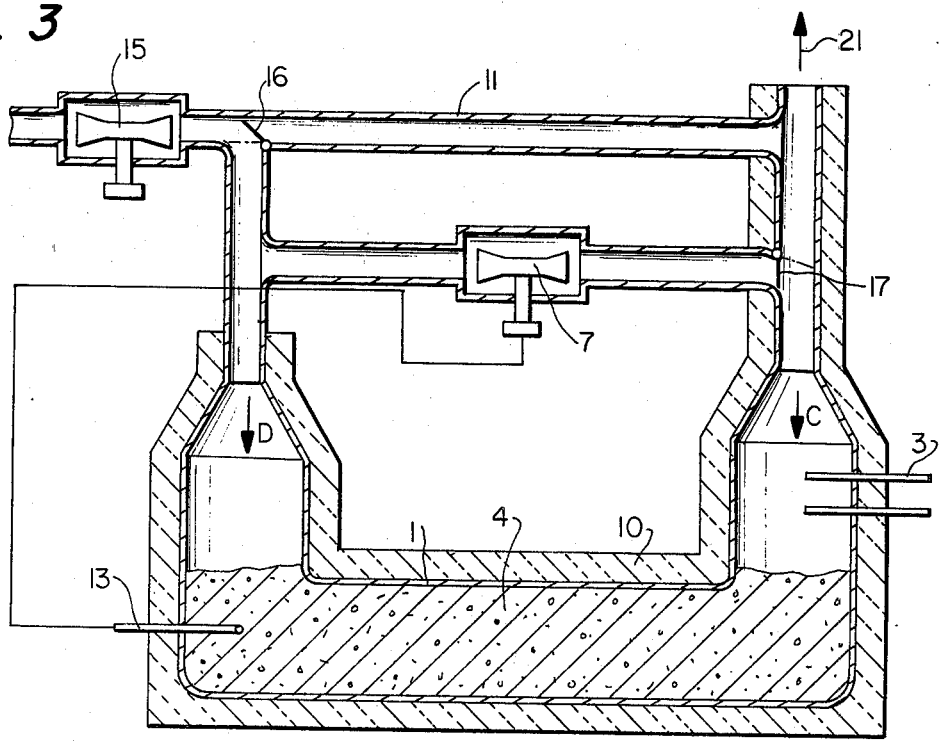
FIG. 3 is a schematic cross-sectional view illustrating a third embodiment of the present invention.

More particularly, as shown in FIG. 3 of the drawings, a completely closed circulation path for the circulation of charging flow of gas C includes the interior of regenerator container 1 and blower 7. However, the discharging flow of gas originates from an exterior source and is circulated by a second blower 15 which may be selectively coupled to and closed off from the interior of regenerator container 1 by valve 16. Also, blower 15 operates to supply the discharging flow of gas, after being heated by the fill of heat retaining material 4, to an exterior consumer, as schematically illustrated by arrow 21. Such consumer is selectively connected to and closed off from the interior of the regenerator container 1 by valve 17.

In the operation of the embodiment of FIG. 3, when the device is operated during the charging operation, then valves 16 and 17 are in the positions shown by the dashed lines thereof in FIG. 3. Blower 7 is operated to pass charging flow of gas C by heat source 3 and then through the fill of heat retaining material 4. After the fill of heat retaining material 4 is heated to a desired degree, blower 7 is stopped, and valves 16 and 17 are moved to the positions thereof shown by the solid lines in FIG. 3. Then, second blower 15 is operated to circulate discharging flow of gas D through the fill of heat retaining material 4 and then to consumer 21. It is additionally to be understood that in accordance with the embodiment of FIG. 3, bypass 11 may be provided to selectively bypass a portion of the discharging flow of gas D around the fill of heat retaining material, to thereby provide a regulation of the temperature of the discharging flow of gas which is supplied to the consumer. This may be achieved in a manner similar to that described above with regard to FIG. 1.

With regard to all of the embodiments described above, when the demand of the consumer on the system is so great that the discharging flow of gas D exiting from the fill of heat retaining material 4 is not heated to the desired temperature, such discharging flow of gas D may be supplementally heated by operation of the heat source 3. This ensures that the system is operable even during periods of very great demand.

Additionally, in all embodiments of the present invention, it is possible to regulate the operation of the regenerative heater as a function of the amount of heat required by the consumer. For example, it is possible to regulate the speed or RPM of the blowers 7 or 15 during the discharging operation as a function of the heat required by the consumer.

Although the present invention has been described above with regard to specific structural arrangements and operating features, it is to be understood that various modifications and alterations of such features may be made without departing from the scope of the present invention.

What we claim is:

1. A regenerative heater comprising:
    a regenerator container having open opposite ends and air-impermeable walls;
    a fill of heat retaining material positioned within said regenator container, said fill of heat retaining material comprising solid fine granular particles having a low thermal conductivity, and said fill of heat retaining material being permeable to the passage therethrough of air, throughout the entire length thereof taken in opposite directions between said open opposite ends of said regenerator container;
    a heat source positioned adjacent a first end of said fill of heat retaining material;
    means for circulating a charging first flow of gas in a first direction through said fill of heat retaining material, such that said charging flow of gas is heated by said heat source and then passes through the entire length of said fill of heat retaining material, from said first end thereof to a second opposite end thereof, and across substantially the entire cross-section thereof, while transferring heat to said fill of heat retaining material;
    means for circulating a discharging second flow of gas in a second direction opposite to said first direction through said fill of heat retaining material, such that said discharging flow of gas passes through the entire length of said fill of heat retaining material, from said second end thereof to said first end thereof, and across substantially the entire cross-section thereof, while receiving heat from said fill of heat retaining material;
    said charging and discharging flows of gas being entirely enclosed in a completely closed circulation path including the interior of said regenerator container; and
    said means for circulating a charging flow of gas and said means for circulating a discharging flow of gas comprising a single reversibly operable blower positioned in said completely closed circulation loop.

2. A regenerative heater as claimed in claim 1, further comprising a heat exchanger positioned in said completely closed circulation path at a location between said blower and said heat source.

3. A regenerative heater as claimed in claim 2, wherein said completely closed circulation path comprises bypass means for bypassing said charging flow of gas around said heat exchanger.

4. A regenerative heater as claimed in claim 1, further comprising means for preventing said blower from becoming overheated during the circulation of said charging flow of gas.

5. A regenerative heater as claimed in claim 4, wherein said preventing means comprises an auxiliary heat regenerator positioned in said completely closed circulation path at a location between said second end of said fill of heat retaining material and said blower, such that extra heat from said charging flow of gas, after said fill of heat retaining material has absorbed its capacity of heat, is retained in said auxiliary heat regenerator and is prevented from reaching said blower.

6. A regenerative heater as claimed in claim 5, wherein said preventing means further comprises thermostat means, operatively connected to said blower, for determining when said auxiliary heat regenerator has absorbed a predetermined maximum quantity of heat from said charging flow of gas and for thereafter stopping operation of said blower.

7. A regenerative heater as claimed in claim 4, wherein said preventing means comprises thermostat means, operatively connected to said blower, for determining when said fill of heat retaining material has absorbed a predetermined maximum quantity of heat from said charging flow of gas and for thereafter stopping operation of said blower.

8. A regenerative heater as claimed in claim 1, wherein said completely closed circulation path comprises bypass means for bypassing a portion of said discharging flow of gas around said fill of heat retaining material.

9. A regenerative heater as claimed in claim 1, wherein said completely closed circulation path further comprises means for preventing an over-pressure therein.

10. A regenerative heater as claimed in claim 9, wherein said preventing means comprises an enlarged equalization chamber.

11. A regenerative heater as claimed in claim 1, wherein the ratio of the length of said fill of heat retaining material, between said first and second ends thereof, to the transverse width thereof is greater than 1 and smaller than 4.

12. A regenerative heater as claimed in claim 11, wherein said ratio is greater than 1.5.

13. A regenerative heater as claimed in claim 11, wherein said ratio is smaller than 2.5.

14. A regenerative heater as claimed in claim 1, further comprising baffle means positioned adjacent said first and second ends of said fill of heat retaining material for uniformly distributing the respective said flows of gas throughout the cross-sections of said first and second ends.

15. A regenerative heater as claimed in claim 1, wherein said fill of heat retaining material is supported within said regenerator container by means of a support which is permeable to air.

16. A regenerative heater as claimed in claim 15, wherein said support inclines inwardly toward the center of said regenerator container.

17. A regenerative heater as claimed in claim 15, wherein said support comprises a perforate plate and a metal screen supported by said perforate plate.

18. A regenerative heater as claimed in claim 15, wherein said support comprises a porous filter plate formed of a temperature resistant concrete material.

19. A regenerative heater as claimed in claim 15, wherein said fill of heat retaining material includes a layer of granular particles, located directly above said support, having a particle size of up to 10 mm.

20. A regenerative heater as claimed in claim 1, wherein said granular particles of said fill of heat retaining material have a particle size of from 0.5 to 3 mm.

21. A regenerative heater as claimed in claim 20, wherein said particle size is from 1 to 3 mm.

22. A regenerative heater as claimed in claim 1, wherein the thermal conductivity of said fill of heat retaining material is lower than 2 kcal/mh°C.

23. A regenerative heater as claimed in claim 1, wherein said fill of heat retaining material has a specific moisture content such that upon transfer of said moisture to said gas during circulation thereof in said completely closed circulation path, said gas will have a relative humidity not exceeding 80%.

24. A process for regeneratively heating gas, said process comprising:
   providing a regenerator container having opposite ends and air-impermeable walls;
   positioning within said regenerator container a fill of heat retaining material comprising solid fine granular particles having a low thermal conductivity, such that said fill of heat retaining material is permeable to the passage therethrough of air, throughout the entire length thereof taken in opposite directions between said open opposite ends of said regenerator container;
   positioning a heat source adjacent a first end of said fill of heat retaining material;
   circulating a charging first flow of gas in a first direction through said fill of heat retaining material, such that said charging flow of gas is heated by said heat source and then passes through the entire length of said fill of heat retaining material, from said first end thereof to a second opposite end thereof, and across substantially the entire cross-section thereof, while transferring heat to said fill of heat retaining material;
   circulating a discharging second flow of gas in a second direction opposite to said first direction through said fill of heat retaining material, such that said discharging flow of gas passes through the entire length of said fill of heat retaining material, from said second end thereof to said first end thereof, and across substantially the entire cross-section thereof, while receiving heat from said fill of heat retaining material;
   entirely enclosing said charging and discharging flows of gas to flow in a completely closed circulation path including the interior of said regenerator container; and
   said steps of circulating said charging and discharging flows of gas comprising passing said charging and discharging flows of gas in opposite directions in said completely closed circulation path by reversibly operating a single blower positioned within said completely closed circulation path.

25. A process as claimed in claim 24, further comprising circulating said discharging flow of gas through a heat exchanger located in said completely closed circulation path.

26. A process as claimed in claim 25, further comprising bypassing said charging flow of gas around said heat exchanger.

27. A process as claimed in claim 24, further comprising preventing said blower from becoming overheated during said circulation of said charging flow of gas.

28. A process as claimed in claim 27, wherein said preventing comprises passing said charging flow of gas, after passage thereof through said fill of heat retaining material, through an auxiliary heat regenerator and absorbing therein extra heat from said charging flow of gas remaining therein after said fill of heat retaining material has absorbed its capacity of heat.

29. A process as claimed in claim 28, wherein said preventing further comprises detecting when said auxiliary heat regenerator has absorbed a predetermined maximum quantity of heat from said charging flow of gas, and thereafter stopping operation of said blower.

30. A process as claimed in claim 27, wherein said preventing comprises detecting when said fill of heat retaining material has absorbed a predetermined maximum quantity of heat from said charging flow of gas, and thereafter stopping operation of said blower.

31. A process as claimed in claim 24, further comprising bypassing a portion of said discharging flow of gas around said fill of heat retaining material.

* * * * *